United States Patent [19]

Hollnagel

[11] 3,837,438

[45] Sept. 24, 1974

[54] DISK BRAKE WITH SERVO ACTION

[75] Inventor: Harold S. Hollnagel, Milwaukee, Wis.

[73] Assignee: Kelsey-Hayes Company, Romulus, Mich.

[22] Filed: Apr. 17, 1972

[21] Appl. No.: 244,979

Related U.S. Application Data

[62] Division of Ser. No. 65,080, Aug. 19, 1970, Pat. No. 3,708,040.

[52] U.S. Cl................................ 188/72.2, 188/72.9
[51] Int. Cl............................................ F16d 55/46
[58] Field of Search................... 188/72.2, 72.6, 72.9

[56] References Cited
UNITED STATES PATENTS

| 2,170,893 | 8/1939 | Gallup | 188/72.2 |
| 3,404,756 | 10/1968 | Swift | 188/72.6 X |

Primary Examiner—George E. A. Halvosa
Attorney, Agent, or Firm—Harness, Dickey & Pierce

[57] ABSTRACT

Two embodiments of disk brake assemblies embodying simplified actuators that include tilting pins. The pins are tilted to cause axial movement of the brake pads into frictional engagement with the associated brake rotor. The direction of tilting of the pins is such that a self-operating force is exerted upon the brake.

11 Claims, 7 Drawing Figures

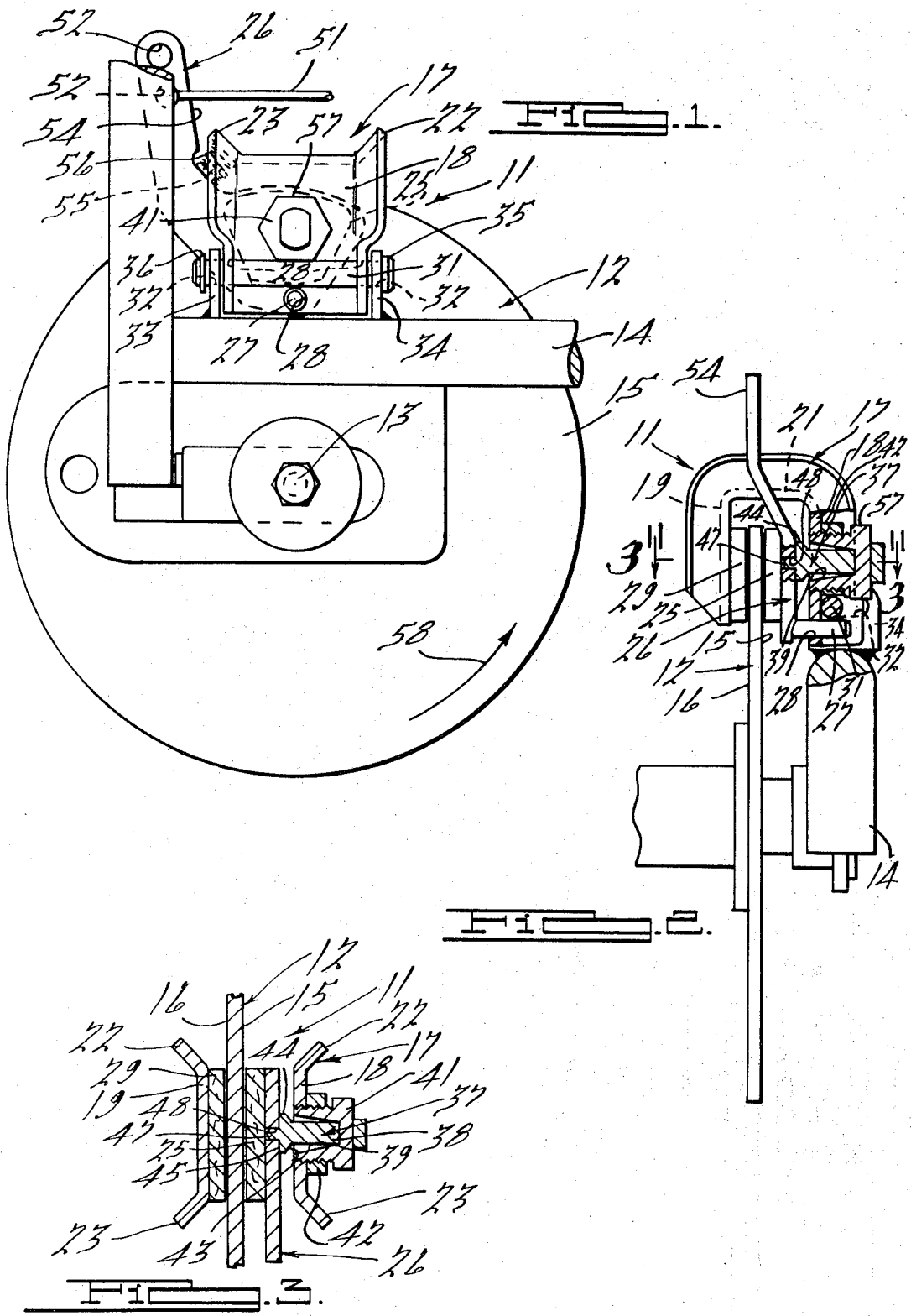

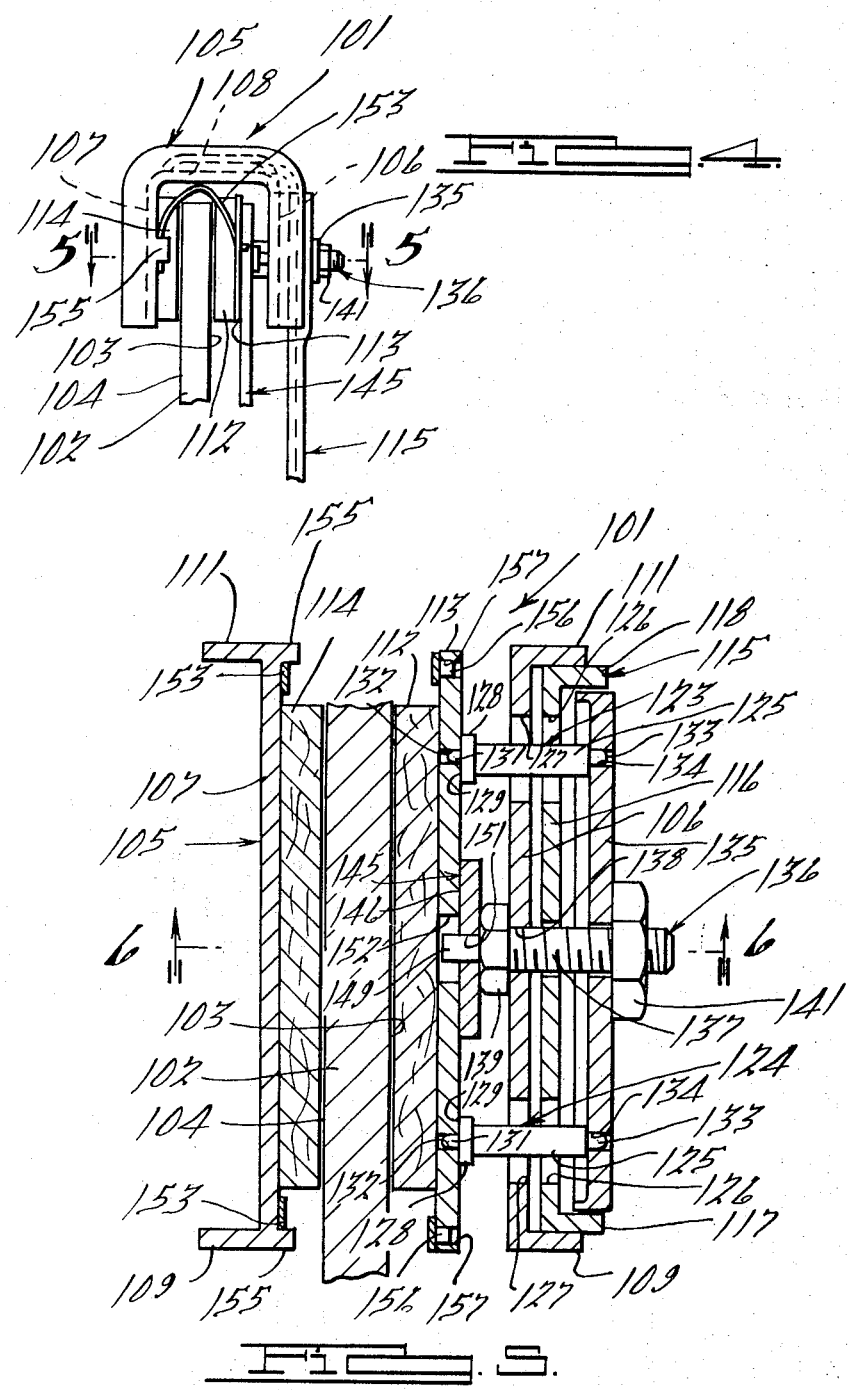

3,837,438

DISK BRAKE WITH SERVO ACTION

This is a division, of U.S. Pat. application Ser. No. 65,080, filed Aug. 19, 1970, now U.S. Pat. No. 3,708,040.

BACKGROUND OF THE INVENTION

This invention relates to a disk brake assembly and more particularly to a disk brake assembly embodying an improved and simplified servo action.

One of the characteristics of disk brakes that has limited the degree of their acceptance, in spite of their many advantages, is the absence of any self-energization. This has necessitated the use of power assists in larger brake applications and has limited the acceptance of disk brakes for some smaller duty uses. Although various devices have been proposed whereby the disk brake assembly will be inherently self-energizing, these devices have been, for the most part, either complicated or not susceptible for high volume production.

It is, therefore, a principal object of this invention to provide an improved and simplified disk brake assembly.

It is another object of the invention to provide an improved and simplified disk brake actuator.

It is a further object of the invention to provide an improved and simplified disk brake assembly that is inherently self-energizing.

BRIEF SUMMARY OF THE INVENTION

A disk brake assembly embodying this invention is particularly adapted for braking the rotation of an associated brake rotor. The assembly includes a brake pad having a frictional lining that is juxtaposed to a braking surface of the associated rotor, a supporting member held against rotation about the axis of rotation of the associated rotor and a tilting pin is interposed between the brake pad and the supporting member. The tilting pin is associated with the brake pad and with the supporting member for effecting movement of the brake pad relative to the supporting member when the tilting pin is moved from a first position to a second position for moving the brake pad frictional lining into frictional engagement with the rotor braking surface. Actuating means are provided for moving the tilting pin from its first position to its second position to actuate the brake assembly.

A further feature of the invention is also adapted to be embodied in a disk brake assembly for braking the rotation of an associated disk brake rotor. The brake assembly includes a brake pad having a frictional lining adapted to engage a braking surface of the associated rotor and a supporting member. A lever has an operative connection to the brake pad and a pivotal connection to the supporting member for effecting transverse movement of the brake pad relative to the supporting member upon pivotal movement of the lever. Means are provided for effecting axial movement of the brake pad relative to the supporting member upon the transverse movement for bringing the brake pad into frictional engagement with the rotor braking surface.

BRIEF DESCRIPTION OF THE DRAWINGS

FIG. 1 is a side elevational view of a disk brake assembly incorporating a first embodiment of the invention.

FIG. 2 is an end elevational view of the brake shown in FIG. 1, with portions broken away to more clearly show the construction.

FIG. 3 is a cross-sectional view taken along the line 3—3 of FIG. 2.

FIGS. 4 through 7 show another embodiment of the invention.

FIG. 4 is an end elevational view of the brake;

FIG. 5 is an enlarged cross-sectional view taken along the line 5—5 of FIG. 4;

FIG. 6 is a cross-sectional view taken along the line 6—6 of FIG. 5; and

FIG. 7 is a cross-sectional view taken along the line 7—7 of FIG. 6.

DETAILED DESCRIPTION OF THE PREFERRED EMBODIMENTS

EMBODIMENTS OF FIGS. 1 THROUGH 3

Figure 6:
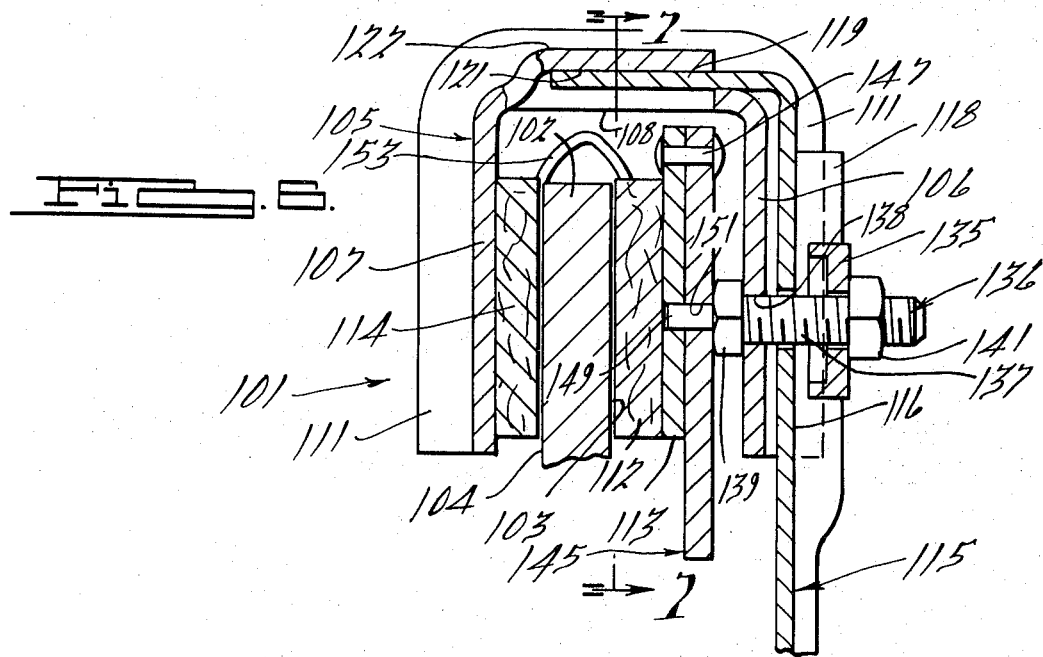

A disk brake assembly incorporating a first embodiment of the invention is identified generally by the reference numeral 11. The brake assembly 11 is particularly adapted for use in recreational vehicles such as mini-bikes, snowmobiles or the like. In such an embodiment, the brake assembly 11 is adapted to cooperate with a brake rotor 12 that is supported for rotation about an axle 13 that is fixed to the frame assembly 14 of the associated vehicle. The rotor 12 is fixed for rotation with the wheels or other driving elements of the associated vehicle in any known manner (not shown). The rotor 12 has oppositely disposed braking surfaces 15 and 16.

The brake assembly 11 includes a caliper, indicated generally by the reference numeral 17, that is formed from sheet metal or the like and which has legs 18 and 19 that are juxtaposed to the rotor braking surfaces 15 and 16, respectively. A bridge piece 21 interconnects the legs 18 and 19 and integral ribs 22 and 23 provide structural reinforcement for the legs 18 and 19 and bridge 21.

A first brake pad is formed by means of a frictional lining 25 that is affixed to a lever 26 in any known manner. This first brake pad is interposed between the rotor braking surface 15 and the caliper leg 18. The pin 27 is staked to the lever 26 and extends through an aperture 28 in the caliper leg 18 for pivotally supporting the lever 26 and frictional lining 25 upon the caliper 17.

A second brake pad is formed by a frictional lining 29 that is affixed in any known manner to the caliper leg 19. The frictional lining 29 is juxtaposed to the rotor braking surface 16.

The caliper assembly 17 is supported for pivotal and sliding movement relative to the rotor 12 by means of a pin 31 that extends through spaced openings formed in the ribs 22 and 23 of the caliper leg 18. The outer ends of the pin 31 are slidably and pivotally supported in elongated slots 32 formed in a pair of upstanding brackets 33 and 34 that are affixed to the frame 14. The pin 31 has a head 35 at one end and a cotter pin 36 at its other end holds the pin 31 in axial position.

A tilting pin, indicated generally by the reference numeral 37, is interposed between the caliper 17 and the first brake pad. The tilting pin has a cylindrical shank 38 that is received in a conical recess 39 formed in an externally threaded member 41. The externally threaded member 41 is threadedly received in a nut 42 that is affixed to the caliper leg 18 in any known manner. The tilting pin 37 is formed with a conical segment 43 at one end of the cylindrical portion 38 which segment terminates at a larger diameter cylindrical segment 44. The segment 44 defines a shoulder 45 that is in engagement with the outer face of the lever 26. A small projection 47 is formed on the tilting pin 37 centrally of the shoulder 45. This projection is received in an opening 48 formed in the lever 26.

An actuating cable 51 is affixed to one of two apertures 52 formed in an upwardly extending and offset portion 54 of the lever 26. The cable 51 is adapted to exert a pull on the lever 26 that causes it to pivot in a clockwise direction about the supporting pivot pin 27 as viewed in FIG. 1 as will become more apparent as this description proceeds. A tang 55 is formed on the lever portion 26 and is encircled by a return spring 56. The return spring 56 bears against the caliper rib 23 to exert a counterclockwise bias on the lever 26.

The frictional linings 25 and 27 are normally held in light rubbing contact with the rotor braking surfaces 15 and 16 when the brake is released as shown in the figures. Under this condition the tilting pin 37 extends in a substantially perpendicular direction with respect to the rotor braking surface 15. This light rubbing contact may be maintained through adjustment of the threaded member 41 in the nut 42. This adjustment may be made to compensate for wear of the frictional linings 25 and 29. The member 41 is provided with a hexagonal head 57 to facilitate this adjustment.

In operation, the rotor 12 will normally rotate about the axle 13 in the direction of the arrow 58. When it is desired to halt the rotation of the rotor 12 a pull is exerted upon the cable 51. This pull causes the lever 26 to pivot in a clockwise direction relative to the caliper 17 about the pivot pin 27 as viewed in FIG. 1. At this time, the return spring 56 will be compressed. When the lever 26 rotates, the tilting pin 37 will be displaced from its normal perpendicular relationship relative to the rotor surface 15. The tilting pin 37 will move from its normal perpendicular position into a second position that is disposed at an angle to the rotor braking surface 15. During this movement, the projection 47 of the pin 37 will be displaced toward the direction of rotor rotation. As the tilting pin 37 pivots, the shoulder 45 will be displaced from a flush engagement with the outer surface of the lever 26 to an angled relation to this lever. This will in effect increase the distance between the base of the recess 39 and the frictional lining 25. This increase in distance causes axial movement of the frictional lining 25 into frictional engagement with the rotor braking surface 15.

At the same time, a reactive force will be exerted upon the caliper 17 that causes it to move axially with respect to the rotor 12 by sliding of the pin 31 in the slots 32. This axial movement of the caliper 17 will cause the frictional lining 29 to move into frictional engagement with the rotor braking surface 16. It should be noted that the caliper 17 may pivot slightly about the pin 31 to ensure full face to face engagement of the frictional linings 25 and 29 with the respective rotor braking surfaces 15 and 16.

When the frictional linings 25 and 29 are forced into axial engagement with the rotor braking surfaces 15 and 16 the rotation of the rotor 12 will be retarded. Since the pin 37 has been tilted at an angle leading into the direction of rotor rotation 58, a self-energization will be exerted upon the frictional linings 25 and 29. This assists in the braking operation.

When the tension on the cable 31 is released, the return spring 56 will release the brake operation. If desired, an additional return spring (not shown) may encircle the cable 51 for exerting a restoring force on the lever 56.

EMBODIMENT OF FIGS. 4 THROUGH 7

A second embodiment of a disk brake assembly incorporating this invention is identified generally by the reference numeral 101. The brake assembly 101 is primarily intended for heavier duty use than the embodiment previously described. In this embodiment, the brake assembly 101 is adapted to coact with a rotor 102 having oppositely disposed braking surfaces 103 and 104. The rotor 102 is fixed for rotation with the element to be braked in any known manner (not shown).

The brake assembly 101 includes a caliper, indicated generally by the reference numeral 105 which caliper has oppositely disposed legs 106 and 107 that are juxtaposed to the rotor braking surfaces 103 and 104, respectively. The legs 106 and 107 are integrally connected by means of a bridge 108 and the entire caliper 105 is reinforced by outwardly extending ribs 109 and 111.

A first brake pad is interposed between the rotor braking surface 103 and the caliper leg 106. This first brake pad includes a frictional lining 112 and a backing plate 113. The lining 112 is affixed to the backing plate 113 in any known manner, for example by bonding.

A frictional lining 114 is affixed to the caliper leg 107 and is interposed between this leg and the rotor braking surface 104. The lining 114 is bonded or otherwise affixed to the caliper leg 107 and thus forms a second brake pad with this caliper leg.

A torque taking member, indicated generally by the reference numeral 115 is affixed against rotation relative to the rotor 102 in any known manner. The torque taking member 115 has a portion 116 that is juxtaposed to the surface of the caliper leg 106 that is disposed outwardly of the rotor braking surface 103. Flanges 117 and 118 are formed integrally with the outer ends of the torque taking member 115 at the opposite sides of the portion 116. The flanges 117 and 118 may slidably engage the caliper flanges 109 and 111.

Figure 7:
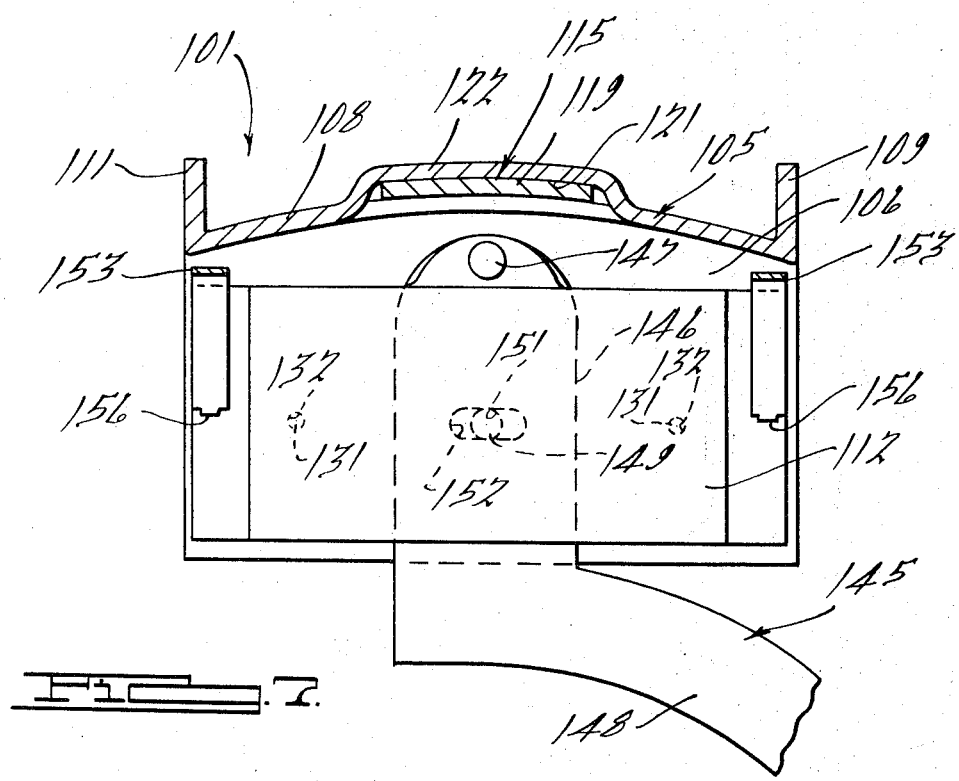

At the upper end of the torque taking member portion 116, the torque taking member is formed with an axially extending projection 119 that extends across at least a portion of the outer periphery of the rotor 102. The torque taking member portion 119 extends into a slot 121 formed by an outwardly struck portion 122 of the caliper bridge 108 (FIGS. 6 and 7). This engagement between the torque taking member portion 119 and the caliper portion 122 provides radial support for the caliper 105 relative to the torque taking member 115.

A pair of tilting pins 123 and 124 are operatively interposed between the caliper 105 and the first brake pad backing plate 113. The tilting pins 123 and 124 each have the same shape and are comprised of elongated cylindrical portions 125 that extend through elongated slots 126 and 127 formed in the torque taking member portion 116 and caliper leg 106, respectively. Adjacent the backing plate 113 the pins 123 and 124 are formed with larger diameter cylindrical portions 128 that define shoulders 129 that are engaged with the backing plate 113. Centrally of the shoulders 129 small projections 131 are formed that are received in apertures 132 formed in the backing plate 113.

At their opposite ends, the pins 123 and 124 are formed with projections 133 that are received in respective apertures 134 of a bearing member 135. The bearing member 135 is axially affixed relative to the caliper 105 by means including an adjustment pin, indicated generally by the reference numeral 136. The adjustment pin 136 has a threaded portion 137 that is received in a tapped opening 138 in the caliper leg 106. A jamb nut 139 is affixed on the threaded portion 137 and engages the caliper leg 106 on the side adjacent the rotor braking surface 103 for axially fixing the adjustment member 136 relative to the caliper 105. An adjusting nut 141 is threaded onto the exposed outer end of the adjusting member 136 to axially fix the position of the bearing member 136 relative to the caliper 105.

It should be readily apparent that axial adjustment of the bearing member 135 along the adjusting member 136 by positioning of the adjustment nut 141 will effect relative axial movement between the first frictional lining 112 and the caliper 105. This axial movement will compensate for wear of the frictional linings 112 and 114. Preferably, the tilting pins 123 and 124 are maintained in a perpendicular relationship relative to the rotor braking surface 103 during this adjustment for a reason which will become apparent as this description proceeds.

An actuating lever, indicated generally by the reference numeral 145 has an upstanding portion 146 that is pivotally journalled on the first brake pad backing plate 113 by means of a pivot pin 147. The lower end of the actuating lever 145 is offset, as at 148 and is adapted to be connected to any suitable actuator, for example an electric solenoid (not shown).

The lever 145 is also pivotally supported on a cylindrical projection 149 of the adjusting member 136 (FIG. 5). The cylindrical portion 149 extends through a bore 151 of the lever 145 to accomplish this pivotal support. The exposed end of the projection 149 is also received in an elongated slot 152 formed in the backing plate 113.

A pair of generally U-shaped return springs 153 are interposed between the caliper leg 107 and the brake pad backing plate 113. One end of the springs 153 is trapped relative to the caliper leg 107 by a pair of inwardly extending embossments 155 of the flanges 109 and 111. The other ends of the springs 153 are formed with tangs 156 that extend into apertures 157 formed in the backing plate 113. Thus, the springs 153 have the effect of urging the frictional linings 112 and 114 away from each other.

In operation, the frictional linings 112 and 113 are normally in light rubbing contact with the rotor braking surfaces 103 and 104. When it is desired to actuate brake assembly 101, the lever 145 is actuated by the solenoid or other actuator. The lever is pivoted in a clockwise direction about the adjusting member cylindrical portion 149 as viewed in FIG. 7. At this time, a force is exerted upon the first brake pad through its backing plate 113 by means of the pivotal connection with the lever 145 afforded by the pin 147. Hence, the backing plate 113 moves transversely with respect to the caliper 105. This movement is transmitted to the ends of the tilting pins 123 and 124 through their projections 131. When the pins 123 and 124 are tilted the surfaces 129 move from a full face engagement with the backing plate 115 into an angled relationship with the backing plate. This has the effect of increasing the distance between the backing plate 113 and the caliper 105 since the other ends of the pins 123 and 124 are axially fixed relative to the caliper 105 by the bearing member 135. As in the previously described embodiment, the frictional lining 112 is, therefore, axially forced into frictional engagement with the rotor braking surface 103.

At the same time, a reactive force is exerted upon the caliper 105 that causes the caliper 105 to slide relative to the torque taking member 115. This brings the frictional lining 114 into frictional engagement with the rotor braking surface 104. The caliper 105 is held against rotation by its engagements with the torque taking member 115 which have been previously described.

As in the previously described embodiment, the pins 123 and 124 tilt in the direction of rotor rotation upon actuation. Hence, they will provide a self-energizing force upon the frictional linings 112 and 114. When the brake pads are brought into axial engagement with the rotor braking surfaces 103 and 104, the springs 153 are deflected. Upon release of the actuating force, these springs will release the brake linings 112 and 114 from their tight frictional engagement with the rotor 104.

It should be noted that in each embodiment simplified actuating arrangement is provided for the brake pads. The use of the simplified tilting pin actuator has the additional advantage in providing a relatively simple self-energization for the brake pads.

It is to be understood that various modifications may be made from the embodiments specifically described without departing from the spirit and scope of the invention, as defined by the appended claims.

I claim:

1. A disk brake assembly for braking the rotation of an associated rotor or the like comprising a brake pad having a frictional lining juxtaposed to a braking surface of the associated rotor, a supporting member held against rotation about the axis of rotation of the associated rotor, tilting pin means interposed between said brake pad and said supporting member, said tilting pin means being associated with said brake pad and with said supporting member for effecting movement of said brake pad relative to said supporting member in a direction parallel to the axis of rotation of the associated rotor when said tilting pin means is moved from a first position to a second position for moving said brake pad frictional lining into frictional engagement with the rotor braking surface, said tilting pin means being movable between its first and second positions in response to movement of said brake pad relative to said supporting member in a direction normal to the axial direction, lever means, means for connecting said lever means to said supporting member for pivotal movement about a first pivot axis parallel to the rotor axis, and means for pivotally connecting said lever means directly to said brake pad for pivotal movement about a second pivot axis parallel to but offset from said first pivot axis, pivotal movement of said lever means about said first pivot axis being effective to move said brake pad initially in said normal direction and to move said tilting pin means from its first position to its second position to actuate said brake assembly.

2. A disk brake assembly as set forth in claim 1 wherein the tilting pin means is substantially perpendicular to the rotor braking surface when in its first position and tilts toward the direction of rotation of the rotor braking surface when in its second position for exerting a selfenergizing force upon the associated brake pad.

3. A disk brake assembly as set forth in claim 1 wherein the supporting member comprises a caliper, and further including a second brake pad fixed against axial movement relative to said caliper, said caliper being supported for movement in a direction having an axial component relative to the associated disk brake rotor upon actuation of the first mentioned brake pad for bringing said second brake pad into frictional engagement with an associated braking surface of the disk brake rotor.

4. A disk brake assembly as set forth in claim 3 wherein the tilting pin means is substantially perpendicular to the rotor braking surface when in its first position and tilts toward the direction of rotation of the rotor braking surface when in its second position for exerting a self-energizing force upon the associated brake pad.

5. A disk brake assembly as set forth in claim 1 wherein the tilting pin means has operatively pivotal connections at its opposite ends to the brake pad and supporting member, respectively.

6. A disk brake assembly as set forth in claim 5 wherein the tilting pin means comprising a pair of tilting pins.

7. A disk brake assembly as set forth in claim 1 further including means for adjusting the position of the tilting pin means for compensating for wear of the brake pad frictional lining.

8. A disk brake assembly as set forth in claim 1 wherein the tilting pin means defines a shoulder in substantially full face engagement with the brake pad when said tilting pin means is in its first position and angularly disposed with respect thereto when said tilting pin means is in its second position.

9. A disk brake assembly as set forth in claim 1 wherein the tilting pin means comprises a pair of spaced tilting pins.

10. A disk brake assembly as set forth in claim 9 wherein the operative engagement of the tilting pins with the caliper is provided by engagement of said pins with a bearing member that is fixed axially relative to the supporting member.

11. A disk brake assembly as set forth in claim 10 further including means for adjusting the axial position of the bearing member relative to the supporting member for compensating for wear of the frictional lining of the pads.

* * * * *